No. 639,820. Patented Dec. 26, 1899.
C. W. MARTIN.
POISON DISTRIBUTER.
(Application filed Mar. 21, 1898.)

(No Model.)

Witnesses:
Samuel Sommer
George Reynolds

Inventor.
Charles W. Martin

UNITED STATES PATENT OFFICE.

CHARLES W. MARTIN, OF ONEONTA, NEW YORK.

POISON-DISTRIBUTER.

SPECIFICATION forming part of Letters Patent No. 639,820, dated December 26, 1899.

Application filed March 21, 1898. Serial No. 674,617. (No model.)

*To all whom it may concern:*

Be it known that I, CHARLES W. MARTIN, a citizen of the United States, residing in Oneonta, in the county of Otsego and State of New York, have invented certain new and useful Improvements in Poison-Distributers; and I do hereby declare the following to be a full, clear, and exact description of the invention, such as will enable others skilled in the art to which it appertains to make and use the same.

My invention relates to new and useful improvements in poison-distributers, especially adapted for distributing paris-green or other poisons mixed with plaster or any other like substance upon growing plants, such as potato plants or vines, for the purpose of the extermination of potato-bugs or beetles or other pestilent insects.

The primary object of this invention is to provide a device or apparatus that will uniformly distribute the poison; and, furthermore, the invention contemplates the provision of a simple, inexpensive, and durable means for accomplishing the above-mentioned objects.

With these and other objects in view, which will become apparent in the course of the following description, the invention consists in the novel combination and arrangement of simple parts that will be hereinafter fully described, and the points of novelty will be particularly set forth in the claims.

I am enabled to accomplish the objects of the invention by the simple means illustrated in the accompanying drawings, in which—

Figure 1:
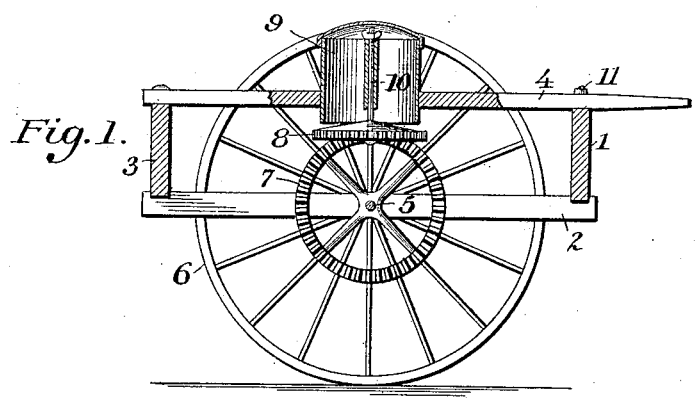
Figure 2:
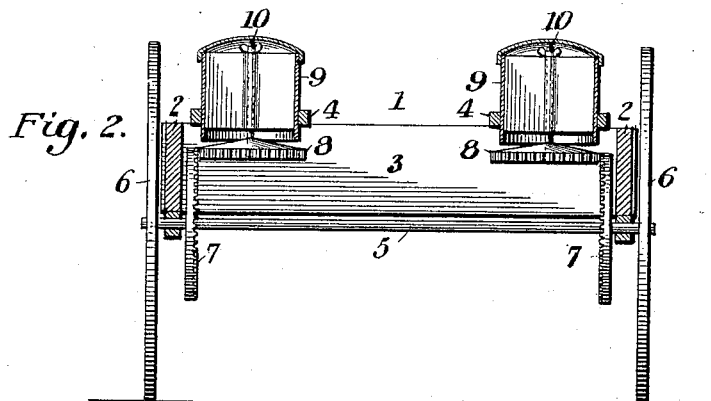
Figure 3:
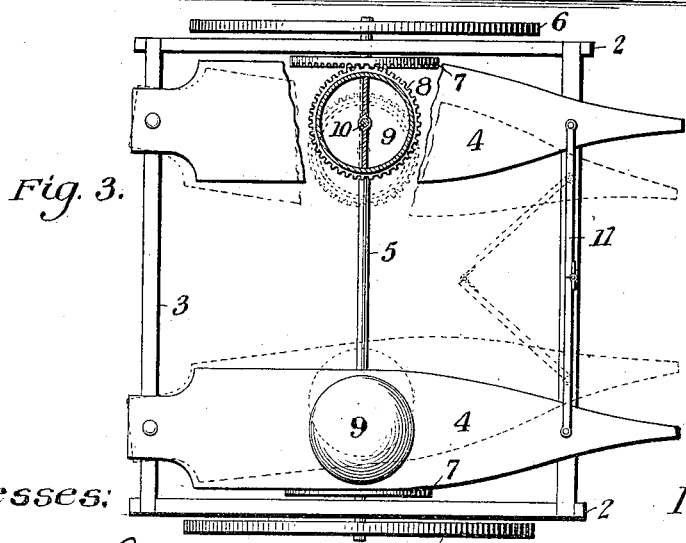

Figure 1 is a side elevation of the machine embodying my invention. Fig. 2 is a vertical section of the same. Fig. 3 is a top plan view of the same, showing the operation of the levers which throw the poison-receptacles in and out of gear.

Referring to the drawings, the numeral 1 indicates the frame of the device, which in the present instance comprises two side bars 2 and front and rear bars 3. The frame thus composed is crossed from front to rear by levers 4, parallel with sides of frame 2. The levers are so made that they may project over the front and rear of frame 3 and are so constructed that they may be moved from right to left in order that the poison-receptacles may be readily removed or thrown out of gear when not required for use.

Mounted in suitable bearings in the downwardly-extending side bars 2 is a transverse shaft or axle 5, provided upon its ends with wheels 6, and said shaft is provided near each end, inside of side bars 2, with cog-wheels 7, which are keyed to shaft 5, adapted to mesh with cogs attached to and forming the bottoms of the poison receptacles and distributers 8, the bottoms of which revolve with the turning of the wheels upon the ends of transverse shaft 5. The poison receptacles or distributers 9 may be made of tin, zinc, or sheet-iron, fourteen inches in height and twelve inches in diameter, or may be made any size desired, securely fastened to the levers 4, and are formed with open bottoms, which are closed by bottoms made of wood, with clogged edges 8, meshing with the cog-wheels keyed to the transverse shaft 5. The bottoms of the poison-receptacles are beveled upward from the cog edges, and the bottoms are raised or lowered by nuts or thumb-screws on top of short shafts 10, which run from the under sides of the bottoms and through the covers of the poison receptacles or distributers 8. The bottoms of the poison receptacles or distributers being raised or lowered at the pleasure of the operator, the revolving bottoms cause an equal and uniform distribution of the contents of the receptacles or distributers upon the plants without any risk or injury from inhaling the poison as it is distributed. The operation of brake 11 to levers 4 is clearly shown in the drawings, Fig. 3.

It is obvious that the invention herein described is susceptible of many minor changes involving mechanical skill within the scope of the invention without departing from the spirit thereof. I therefore do not desire to be understood as limiting myself to the precise construction shown in the drawings—as, for instance, the device illustrated in the drawings is adapted to distribute poison upon two rows of plants simultaneously; but it is obvious that a device adapted to distribute poison upon a single row or upon five rows could be constructed embodying the same principles without in any wise departing from the spirit and scope of my invention.

Having described my invention, what I claim, and desire to secure by Letters Patent, is—

1. In a poison-distributer, the combination with a main frame, of an axle mounted upon carrying-wheels and provided with vertically-arranged cog-wheels, laterally-vibrating levers secured to said frame, poison-receptacles mounted on said levers and provided with revolving bottoms having cogged outer edges engaging the cog-wheels of said axle, substantially as shown and described.

2. In a poison-distributer the combination with a main frame, of an axle mounted upon carrying-wheels and provided with vertically-arranged cog-wheels, laterally-vibrating levers secured to said frame, poison-receptacles mounted on said levers and provided with convex revolving bottoms having their outer edges below the lower edge of said receptacles, and provided with cogged outer edges engaging the cog-wheels of said axle, substantially as shown and described.

3. In a poison-distributer the combination with a main frame, of an axle mounted upon carrying-wheels and provided with vertically-arranged cog-wheels, laterally-vibrating levers secured to said frame, poison-receptacles mounted on said levers and provided with vertically-adjustable revolving bottoms having cogged outer edges engaging the cog-wheels of said axle, substantially as shown and described.

4. In a poison-distributer the combination with a main frame, of an axle mounted upon carrying-wheels and provided with vertically-arranged cog-wheels, laterally-vibrating levers secured to said frame, poison-receptacles mounted on said levers and provided with revolving bottoms having cogged outer edges engaging the cog-wheels of said axle, and arms hinged together at their inner ends and pivoted at their outer ends to said lever, substantially as shown and described.

In testimony whereof I affix my signature in the presence of two witnesses.

CHARLES W. MARTIN.

Witnesses:
GEO. REYNOLDS,
SAMUEL SOMMER.